May 7, 1940.  E. E. ROSAIRE ET AL  2,200,096
GEOPHYSICAL EXPLORATION BY TIME-VARIANT ELECTRIC CURRENTS
Filed Oct. 22, 1937
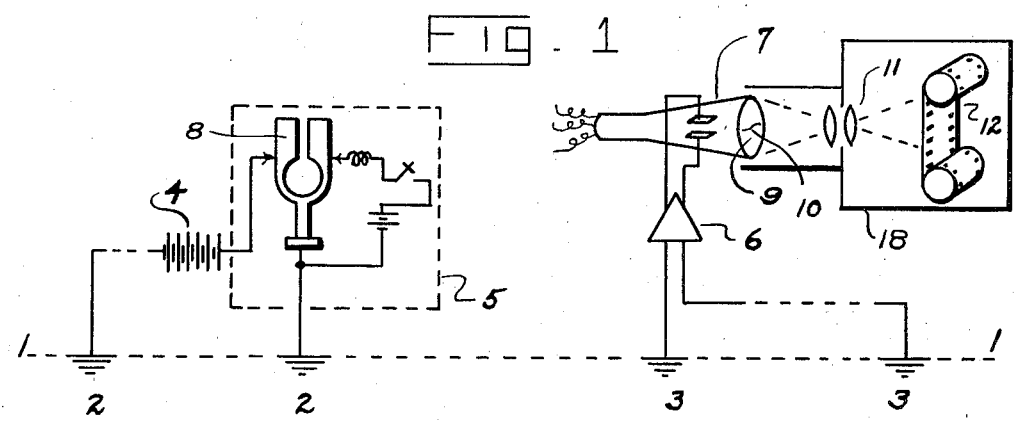
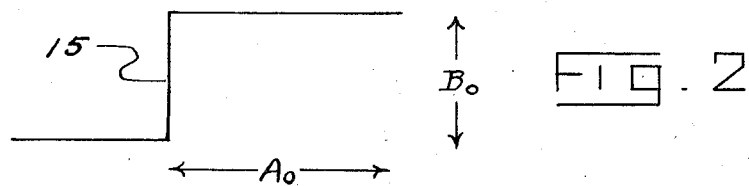
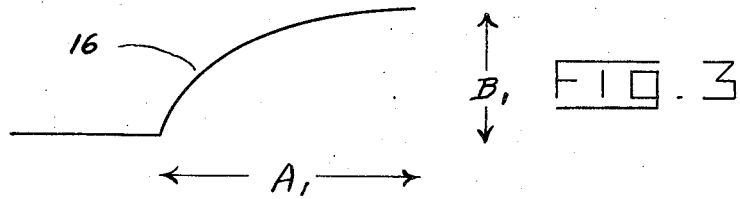
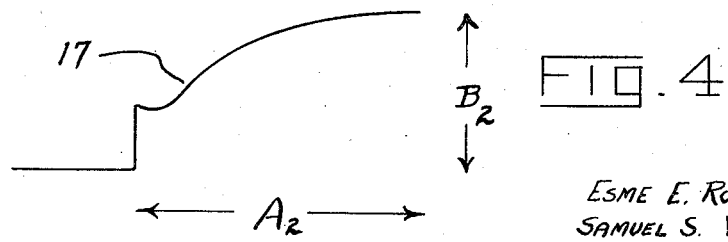
ESME E. ROSAIRE
SAMUEL S. WEST
INVENTORS.
BY Jesse R. Stone
Lester B Clark
ATTORNEYS.

Patented May 7, 1940

2,200,096

UNITED STATES PATENT OFFICE 2,200,096

GEOPHYSICAL EXPLORATION BY TIME-VARIANT ELECTRIC CURRENTS

Esme E. Rosaire and Samuel S. West, Houston, Tex.; said West assignor to said Rosaire Application October 22, 1937, Serial No. 170,342

1 Claim. (Cl. 175—182)

This invention relates to geophysical exploration by the method in which a current which varies with time is caused to flow in the earth and geological data is determined from the modification in the wave form taking place as the current passes through a portion of the earth.

The primary object of this invention is to simplify the apparatus and method heretofore used.

Heretofore, current of some specified wave form has been caused to flow in a region of the earth's crust, and potential in a region subject to the current has been detected. The wave form of the detected potential was rendered available by means of a suitable indicating instrument, usually a cathode ray oscilloscope. In some cases, the detected potential was opposed by another potential whose wave form could be varied, so that the residual indicated wave form was null over a period of time. The methods are described by Blau in United States Patent No. 1,911,137 and in copending applications by S. S. West, Serial No. 103,139 and No. 151,788, now Patent No. 2,162,147 of June 13, 1939, filed September 19, 1936 and July 3, 1937, respectively.

The present invention is concerned with making a permanent record of the detected wave form whereby new and useful results are achieved. Simplification of method and equipment follows from the accomplishment of the following specific objects.

An object of the invention is to record, preferably photographically, the wave form of the detected electrical potentiial. This provides a permanent record which may be examined in the field, then sent to a computing department where it may be studied and analyzed in detail, resulting in the ability to check deductions made in the field and to give an independent opinion based on a wide experience which usually is not available in an operating field personnel.

Aside from providing a permanent record, several new and useful results are accomplished. It has been found that natural earth current transients and other electrical phenomena, as for example, power line interference, have tended to mask the information sought. This form of noise may be largely eliminated by making an exposure lasting for several repetitions of the current impulse. The record consists then of an average exposure of several such repetitions in which extraneous noise of irregularly recurring nature produces at most a slight fogging around the line representing the wanted wave form. A further object of the invention is therefore the provision of method and apparatus producing an effective improvement in the signal-to-noise ratio in electrical prospecting.

Still another object is the production of a record which is amenable to a method of computation as well as to mechanical or automatic analysis and comparison.

An important object of the present invention is to produce a record of the detected potential which is photographically reproducible and capable of being readily analyzed, while a still further object is to analyze such a record for its Fourier components.

Other objects will become apparent from a description of the method and apparatus, taken in connection with the drawing in which:

Fig. 1 is a diagram of one arrangement which fulfills the essential requirements for the practice of the invention.

Fig. 2 shows one suitable wave form of the current caused to flow in the earth.

Fig. 3 shows the wave form of the detected potential recorded over a non-anomalous area.

Fig. 4 shows the wave form of the detected potential recorded over an anomalous area.

For the purpose of describing the invention in detail, it will be assumed that the current caused to flow in the earth is a simple transient of the form caused to occur by the closing of a switch in a battery circuit. The fact that this may be repeated, or made periodic, or that some other wave shape of a periodic current is suitable is fairly obvious after the principles involved for the simple transient case are understood.

For the reason that simple transients, repeated transients, and suitable wave shapes of periodic currents are all suitable in this method of prospecting, and all involve the same physical principle of modification by the earth of any given wave shape, the term "time variable current" has been used in the specification and claim to denote the nature of the current to be caused to flow in the earth.

In Figure 1 the line I—I represents the surface of the earth, in which are embedded current electrodes 2, 2 and potential electrodes 3, 3. A battery 4 supplies voltage to electrodes 2, 2 and thereby causes a transient current to flow in the earth between these points. A circuit make and break mechanism generally designated as 5 is here illustrated as comprising a tuning fork 8 by means of which a repeated square wave or regularly interrupted direct current is applied to the electrodes 2, 2 from the battery 4. An amplifier 6 which is preferably distortionless over a range of say 10 to 10,000 cycles per second, amplifies the potential resulting between the electrodes 3, 3 due to the current flowing between the electrodes 2, 2. The amplified potential is then applied to a cathode ray oscilloscope 7, the sweep circuits of which are not shown as they are well understood in the art of oscillography and the use of cathode ray oscilloscopes.

With the equipment above described the varying potential between the electrodes 3, 3 is amplified without distortion and is applied to the cathode ray oscilloscope 7 to be shown as a standing wave 10 on the fluorescent screen 9 of the oscilloscope. The potential wave can therefore be observed visually on the fluorescent screen of the oscilloscope 7. Such observation permits suitable adjustments of equipment so that a desirable representation of the potential wave is obtained. The invention contemplates the production of a permanent record of the potential wave and to accomplish this function there is provided a camera 18 which comprises a suitable lens 11 and a strip to photosensitive material 12. The record thus produced upon the strip 12 is a permanent record of the standing wave 10 and results from repeated application of the potential at the electrodes 2, 2.

In a recent article entitled "Electrical Earth Transients in Geophysical Prospecting" by L. Statham, pp. 271–277, Geophysics, vol. 1, No. 2, June 1936, there is described the results of an attempt to utilize photographs of intermittent earth transients for determining subsurface geological structure. The article points out that upon comparing the records taken at various locations, the differences, if any, were found to be very slight, the thickness of the line being as great as the spread between the fastest and the slowest transient. It was therefore decided that some other recording scheme, capable of detecting small differences between transients, was necessary, if the transients were to be made useful in geophysical prospecting.

Contrary to the conclusion of the above mentioned article we have found that by means of the present invention as above described, appreciable differences occur in the photographed potential wave forms at the potential electrodes. Further, we have found that these differences are reproducible and repeatable, and that by an analysis of the photographs alone we can detect anomalies similar to those found by the more elaborate method of geo-electrical prospecting described in the above mentioned copending applications.

By reference to Figs. 2, 3, and 4 of the drawing the method of the present invention will be made more fully apparent. It will be assumed that the wave form of the potential which causes current to flow between the electrodes 2, 2 is that shown in Fig. 2 in which the potential rises abruptly to the amplitude $B_0$ and remains at that value for the time interval $A_0$. Fig. 3 shows the standing wave 10 of potential 16 which occurs between the electrodes 3, 3 when these electrodes are located in a non-anomalous area, $B_1$ being the potential amplitude at the end of an interval $A_1$ when the potential is approximately at a steady state. The curve 17 in Fig. 4 is similar to that of Fig. 3 except that it is modified by anomalous conditions in the area under observation. In this curve $B_2$ represents the potential amplitude at an approximate steady state at the end of an interval $A_2$.

With survey records as illustrated in Figs. 2 to 4 desired ultimate information is obtained in a manner that will now be described. For the transient in question, the amplitude $B_1$, or $B_2$, is taken as 100%, and at regular time intervals, say 0.001, 0.002, 0.003, . . . , 0.01 second, the height of the transient is determined as a percentage of $B_1$ or $B_2$. Then, the differences in the heights of the transients, at equal times, indicate differences in sub-surface geological structure, and can be measured and utilized as such. On a map showing the locations of the various electrode stations, the height of the transient at an appropriate time, say 0.003 second, can be marked, and contours drawn to show the relative variations of this value of the transient at different points on the earth's surface.

It is obvious, since the steady state, or a uniformly close approximation thereto, is chosen as 100%, another manner of utilizing the results obtained by the present invention would be to plot, on a map, the times at which the transient had reached a given percent of the steady state, thereby showing the anomalies associated with a different index figure.

It should be noted also that these photographs can be utilized to reproduce the wave form by cutting the film 12 along the curve of the transient, mounting either or both of the parts of the film on a drum, rotating the drum and thereby actuating a stylus for visual, graphical, phonographic or photographic reproduction of the original photographs. During such reproduction, the relative scales of the original photograph can be reduced or enlarged, separately or together, so that the reproduced wave form will have equal time scales, and equal steady state values, thereby permitting direct comparison.

Instead of using a square wave, as illustrated in Fig. 2, other suitable time variant waves may be utilized, and in accordance with the invention the resultant wave form may be treated in a manner similar to that above described whereby subsurface geological structures may be determined.

Transients, when employed in the past, have been used singly or repeated intermittently without making them periodic. In the copending applications already referred to, there was described what may be termed a steady state alternating current method wherein wave shapes other than sinusoidal, preferably rectangular, are used to produce the effect of periodically repeated transients. This latter method is particularly desirable in the present invention in that periodic repetition enables the photographic superposition of several impulses to achieve an orderly integration of signal and a random integration of noise with a resultant increase in signal-to-noise ratio.

Another way of utilizing the invention is through the medium of a record which is reproducible. When so recorded, the wave form may be analyzed for its Fourier components.

As a specific example of a use to which a reproducible record made according to this invention can be put, a transient may be converted into a periodic phenomenon for the purpose of analysis. To accomplish this, the reproducible record of a transient is caused to be reproduced periodically, and the reproduction caused to take the form of periodic electrical impulses. The periodic impulses are then analyzed for their Fourier components, and the shape of the transient expressed in terms of these measured components.

For purpose of illustration, it may be assumed that the generated current is periodic. The wave form of such a current may be expressed as the Fourier series. For example, a rectangular wave may be expressed as:

$$f(t) = A(\sin \omega t + \tfrac{1}{3} \sin \omega t + \tfrac{1}{5} \sin 5\omega t + \ldots )$$

where the function $f(t)$ is the amplitude at the instant $t$, A is an arbitrary constant, and $\omega$ is the angular velocity expressed by $\omega = 2\pi f$ where $f$ is the frequency. Modification of the wave form caused by the current passing through the section of the earth may be directly interpreted as a modification of the coefficient of the terms in the above equation. Thus a measure of the wave shape distortion produced by the earth is provided by determining the Fourier coefficients of the detected wave and comparing them with corresponding coefficients of the generated wave. Instruments known as wave analysers or harmonic analysers are well known. These instruments enable such a measurement to be made if the wave is periodically repeated during the time the measurement is being made.

We have found it desirable, in making a record of the detected potential wave form, that the record be phonographically reproducible and repeatable, so that the record may be used to produce an electrical wave, repeatable periodically as many times as necessary so that said electrical wave may be analyzed for its Fourier components.

One way of phonographically reproducing the detected wave is to blacken the record on one side of the trace, wrapping the thus modified record on a rotatable drum, rotating it before a narrow beam of light, and allowing the reflected light to actuate a photoelectric cell. The output of such a cell, suitably amplified may then readily be analyzed. Another way is to originally produce the record in a form similar to a motion picture sound track, variable either in area or density.

Consideration has been given to the case of a periodically repeated rectangular wave. This special case is the easiest to explain, but is by no means the only possible way.

The description of apparatus has been directed to the photography of the image on a cathode ray oscillograph screen. Alternatively, the type of oscillograph comprising a galvanometer and a moving film may be used. In order to obtain the advantage of orderly integration of signal and random or destructive integration or interference of noise, oscillograms of several successive repetitions of the transient can be recorded, and the results combined subsequently in the laboratory.

Another alternative of the invention so far described consists of generating at the point of detection a wave of standard shape and amplitude and recording the difference between the detected wave and the standard wave. In this manner, the recorded residual contains a concentrated resultant in which anomalous conditions are, in effect, magnified. For example, if the standard wave shape adopted is that of a normal earth, then over normal areas a null would be recorded and residuals which are not null are instantly recognizable as being the result of anomalous conditions. A single transient of any convenient wave form may be used in which case the reproduced record is repeated at any convenient frequency for analysis. Transients may be repeated periodically and a composite record produced which may then be reproduced periodically. Periodic currents of wave forms other than rectangular may be employed. In any case, it is evident that the Fourier terms of the detected wave may be compared with the corresponding terms of the generated wave to yield a numerical measure of the wave shape distortion produced by the portion of the earth under study.

Still another alternative is to record the slope of the detected wave instead of the wave itself. In the detecting circuit the wave may be impressed upon a circuit containing a resistive and a reactive element so that the resultant potential is the slope of the detected potential.

This may be accomplished in the manner described by Scherbaskoy et al., Patent 2,199,536, wherein integrator and derivator circuits are described and illustrated.

The invention claimed is:

In the art of geophysical exploration by time-variable electric currents wherein the waveform distortion caused by the media traversed by the current serves as a measure of the properties of said media, the method of eliminating extraneous electrical effects superposed upon the phenomena under examination comprising, causing a current impulse of predetermined wave shape to flow in a portion of the earth's crust, detecting the superposed potentials resultant from said current and from the extraneous sources, impressing said potentials on an instrument for indicating waveform to produce a weak image of the indicated waveform, and repeating the current impulse and its resultant potential phenomena at such intervals of time that the superposed extraneous phenomena are not each time superposed in the same phase with respect to the current impulse and sufficient times to produce a strong latent image of the phenomena under observation with only weak images of the superposed phenomena.

ESME E. ROSAIRE.
SAMUEL S. WEST.